United States Patent [19]
Rao et al.

[11] Patent Number: 5,313,919
[45] Date of Patent: * May 24, 1994

[54] LOW FRICTION RECIPROCATING PISTON ASSEMBLY

[75] Inventors: Vemulapalli D. N. Rao, Bloomfield Township, Oakland County; Daniel M. Kabat, Oxford; David A. Yeager, Plymouth, all of Mich.

[73] Assignee: Ford Motor Company, Dearborn, Mich.

[ * ] Notice: The portion of the term of this patent subsequent to Aug. 31, 2010 has been disclaimed.

[21] Appl. No.: 76,225

[22] Filed: Jun. 14, 1993

Related U.S. Application Data

[62] Division of Ser. No. 001,693, Jan. 7, 1993, Pat. No. 5,239,955.

[51] Int. Cl.$^5$ ............................................... F22B 5/00
[52] U.S. Cl. .................................. 123/193.4; 92/223; 29/888.048
[58] Field of Search .................... 123/193.4, 193.6; 92/223, 222, 212, 248, 155; 29/888.04, 888.042, 888.044, 888.048; 252/12

[56] References Cited

U.S. PATENT DOCUMENTS

| | | | |
|---|---|---|---|
| 3,671,486 | 6/1972 | Dixon et al. | 252/12 |
| 3,781,205 | 12/1973 | Cairns et al. | 252/12 |
| 3,890,950 | 6/1975 | Haldeman | 123/193.6 |
| 4,012,478 | 3/1977 | Horikawa et al. | 252/12 |
| 4,395,442 | 7/1983 | Meise et al. | 29/888.048 |
| 4,656,711 | 4/1987 | Yagi et al. | 29/888.04 |
| 4,969,433 | 11/1990 | Sougawa | 123/193.6 |
| 5,014,605 | 5/1991 | Santi | 123/193.6 |
| 5,117,742 | 6/1992 | Iida | 92/248 |

Primary Examiner—Tony M. Argenbright
Assistant Examiner—M. Macy
Attorney, Agent, or Firm—Joseph W. Malleck; Roger L. May

[57] ABSTRACT

A low-friction piston construction for use in an oil-fed cylinder bore with the piston skirt relieved to define lands that are coated with SFL (graphite, MoS$_2$, BN, and a special epxoxy resin). A method of making such piston construction including provision of asperities on the skirt wall onto which the SFL coating is thermally sprayed and formation of small pockets at the mouth of the asperities to additionally act as oil replenishing reservoirs. A method of using such piston construction in an engine which comprises provisions of a slightly increased gap between the piston and cylinder wall and formation of a transferred SFL coating from the piston to the cylinder wall resulting in two polished microsmooth mating coatings, each attractive to oil films.

13 Claims, 7 Drawing Sheets

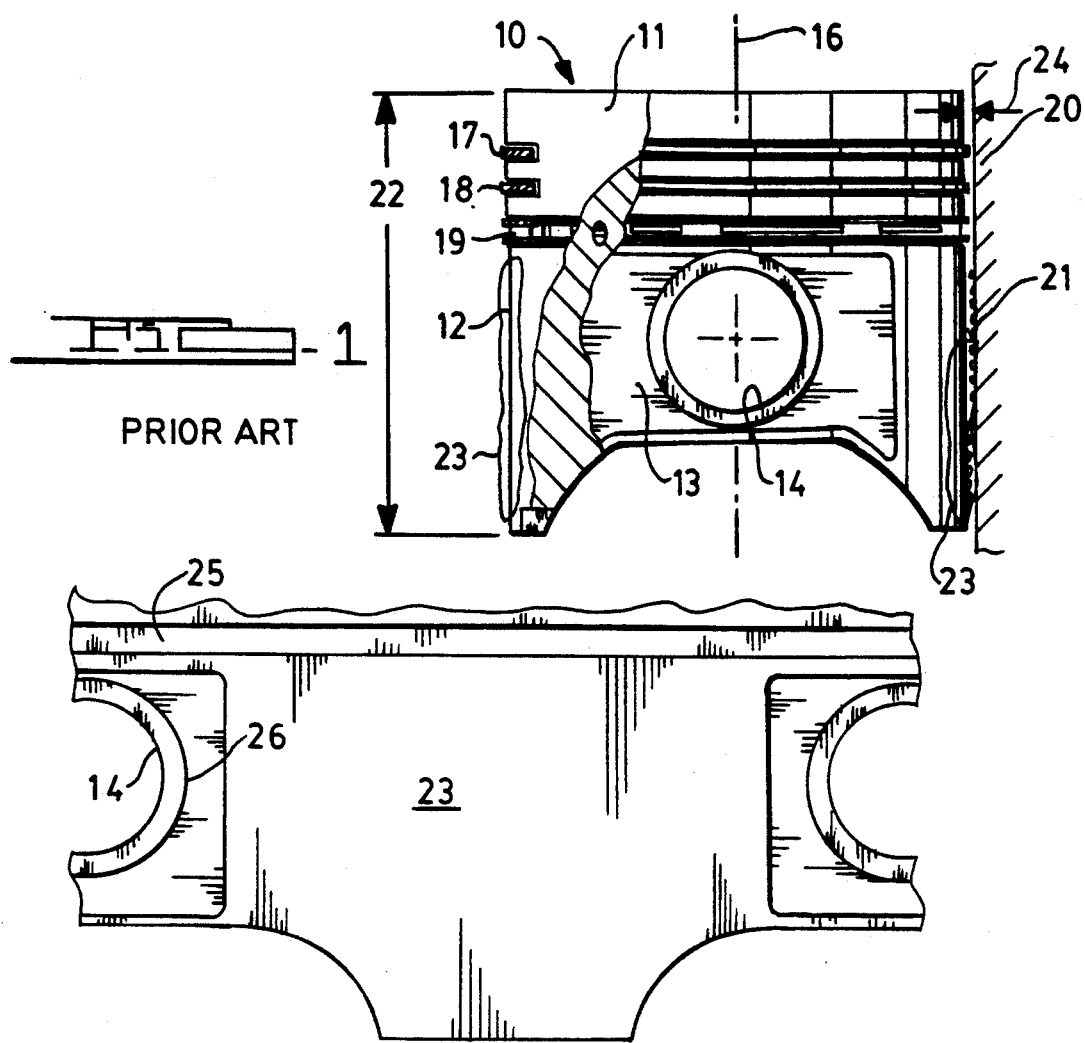
FIG. 1 PRIOR ART
FIG. 2
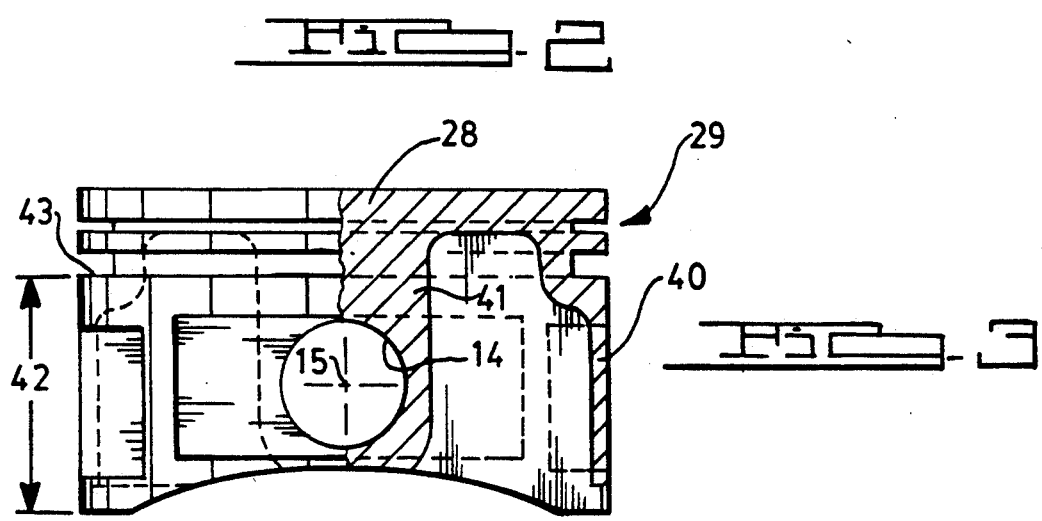
FIG. 3

LOW FRICTION RECIPROCATING PISTON ASSEMBLY

This is a division of application Ser. No. 08/001,693, filed Jan. 7, 1993, now U.S. Pat. No. 5,239,955.

BACKGROUND OF THE INVENTION

1. Technical Field

This invention relates to the design of reciprocating pistons, and more particularly to wet lubricated piston and cylinder assemblies that have reduced friction.

2. Discussion of the Prior Art

It is conventional for reciprocating piston engines to splash lubricating oil along the sides (skirt) of the piston and use piston rings to separate such oil from the combustion zone. Depending on the reciprocating speed of the piston, the piston skirt design can have considerable length and barrel circumference such as the long depending skirts used with diesel engine pistons operating at slower speeds. It is thought by the prior art that such skirts more effectively reduce the slapping forces imparted by an articulating piston rod and induce a surround film of lubricant oil operating in the hydrodynamic friction regime (fluid sliding past other fluid layers in a gradient pattern). Accordingly, it is the conventional wisdom of those skilled in the art that redesign of piston skirts in an oil lubricated assembly will not significantly reduce friction losses, since the hydrodynamic lubrication regime provides the lowest possible friction, and that the existing true barrel design promotes such regime.

Our recent studies show this not to be the case, and that conventional piston skirt design is a major contributor to friction losses, and that the oil film operates in the boundary layer or mixed lubrication regime and not substantially in the hydrodynamic friction regime resulting in high friction data results.

Not fully understanding the nature of piston friction, the prior art had earlier tried fluorinated carbon as a reducer of friction in an oil-fed piston system (see U.S. Pat. Nos. 2,817,562 and 4,831,977). Such use of fluorinated carbon has not been commercially successful because it does not promote hydrodynamic film formation and, as a consequence, friction will remain high at high engine speeds causing the coating to have limited life due to wear.

Solid film lubricants have also been tried in reciprocating assemblies where there is essentially no oil lubrication supply (see U.S. Pat. Nos. 3,896,950 and 4,872,432). These trials used graphite and $MoS_2$ in resin coatings to reduce solid contact friction. However, the modifications that must be made to such solid film lubricants in an oil-lubricated piston system is not known.

SUMMARY OF THE INVENTION

In a first aspect of this invention, a new piston construction is provided with a coating of solid film lubricant (SFL) comprising graphite and molybdenum disulfide in a resin, the construction having one or more of the following features: (i) inducing operation of the lubrication film around the piston to be in the hydrodynamic regime by selectively undercutting the piston skirt broad surface to define oil supply reservoirs and by adjusting the piston-bore wall gap to promote the hydrodynamic regime; (ii) attracting an oil film to fill the adjusted gap by selecting the resin with special characteristics; and (iii) increasing the operating temperature of the solid film lubricant by combining boron nitride and molybdenum disulfide in selected proportions.

More particularly, the low-friction piston construction for use in an oil-fed cylinder bore wall, comprises: (a) means providing a piston crown extending across substantially the entire cross-section of the cylinder bore for sliding movement therein; (b) a circumferentially extending skirt wall depending from the crown; and (c) reciprocating force transmitting means connected to the interior of at least one of said skirt wall and crown, said skirt wall having portions thereof relieved in a radially inward direction, at least the unrelieved portions of the skirt wall having a solid film lubricant coating on its exterior thereof consisting of graphite, molybdenum disulfide, boron nitride, and epoxy resin, said resin comprising a polymer base that provides a supply of at least one of water vapor and hydrocarbon to the graphite component and attracts an oil film thereto.

Another aspect of this invention is a method of making a low-friction piston for use in an oil-fed cylinder bore wall, comprising: (a) providing a cylindrical piston body with a crown, side walls depending from said crown, and structure for supporting at least said crown about a diametrically extending pin axis, said side walls having portions, on opposite sides of said pin axis, conforming to the shape of said bore wall but defining a radial gap therebetween; (b) undercutting the exterior surface of said side walls to define radially exposed lands for sliding along said bore wall; (c) introducing a predetermined pattern of asperities into said lands; (d) uniformly spraying a solid film lubricant coating onto the lands, such coating comprising solid lubricants and a supporting resin, said resin comprising a polymer base that provides a ready supply of at least one of water vapor and hydrocarbon to the solid lubricants and is effective to attract oil film thereto; (e) forming shallow pockets at the mouth of said asperities; and (f) polishing the exposed solid film lubricant crystals to further reduce the height of the coating at said asperities.

Yet still another aspect of this invention is a method of using a low-friction piston in an oil-fed cylinder bore of a reciprocating assembly, said assembly having a central axis of reciprocation, comprising: (a) providing a low-friction piston comprised of a cylindrical body with a crown, depending side walls, and structure for supporting at least said crown about a diametrically extending pin axis, the side walls having portions on opposite sides of said pin axis to conform to the shape of the bore wall but defining a radial gap therebetween, the side walls being relieved on the exterior surface thereof to define radially exposed lands for sliding movement along the bore wall, said lands having a predetermined pattern of asperities therein, and a solid film lubricant coating on said lands, said coating consisting of solid lubricants and a supporting resin, the resin being a polymer base providing a ready supply of at least one of water vapor and hydrocarbon to the solid lubricants and is effective to attract an oil film thereto; (b) mounting the piston on a connecting rod having a pin connecting one end of said rod to said piston for articulating reciprocating movement within said bore, said rod exerting a force on said piston side walls non-aligned with said axis; (c) operating said reciprocating assembly to transfer a portion of said solid film lubricant coating to the cylinder bore wall at least at regions of piston slap, said transferred coating possessing microasperities for trapping oil to retain an oil film during reciprocation in a thickness that produces a lambda of six or greater; and (d) providing reservoirs of oil adjacent said retained oil films for replenishing oil in such films during each reciprocation of said piston.

BRIEF DESCRIPTION OF THE DRAWINGS

FIG. 1 is an elevational view, partially broken-away, of a conventional prior art piston;

FIG. 2 is a view of the skirt wall of FIG. 1 unwrapped onto a flat plane;

FIG. 3 is an elevational view, partially sectioned, of a piston embodying the principles herein;

FIG. 7 is a schematic perspective view of the coated piston of this invention in operative relation to an oil-fed cylinder bore wall;

FIGS. 8-9 are enlarged sectional views of respective circled areas of FIG. 4;

FIG. 13 is a cut-away diagram of an internal combustion engine showing the elements of such engine pertinent to the novel use of the coated piston of this invention;

DETAILED DESCRIPTION AND BEST MODE

Figure 4:
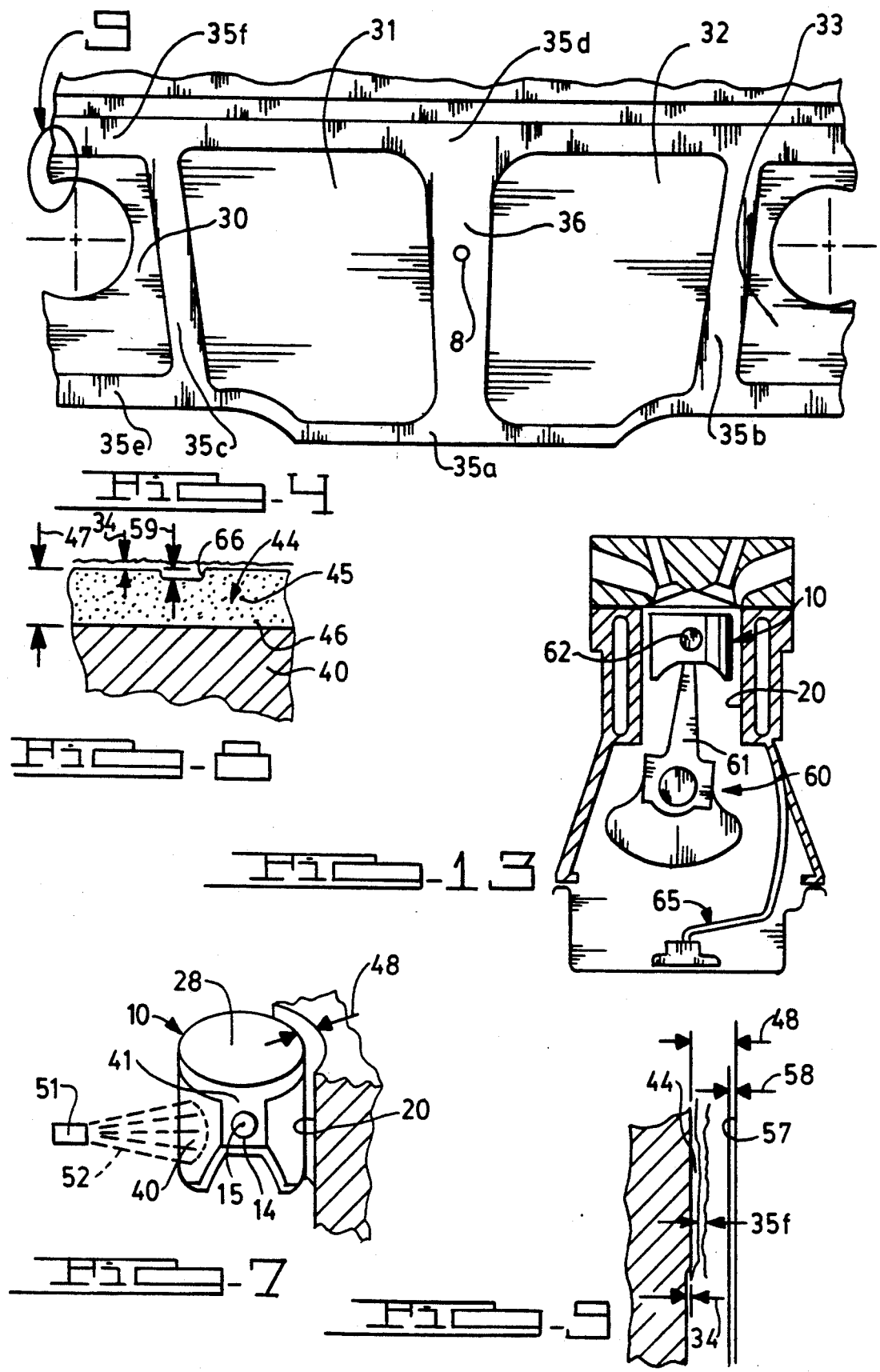
FIG. 4 is a view of the skirt wall of FIG. 3 unwrapped onto a flat plane.

A typical commercial piston 10 for an internal combustion engine is shown in FIG. 1. A crown 11 has side walls 12 (hereinafter sometimes "skirt") depending therefrom, and support structure 13 for transferring load from or to a connecting rod assembly. Structure 13 has walls 14 defining a pin opening along a diametrical axis 75 transverse to the reciprocation axis 16 of the piston. Compression rings 17, 18 and oil ring 19 surround the circumference of the crown and cooperate with the cylinder bore wall to retain splashed crankcase oil 21 below such rings but along the outer surface of the skirts 12. The height or axial length 22 of the skirt extends significantly below the connecting pin opening 14 to increase the slap or thrust area 23 of the piston skirt 12 and thereby enhance the barrel effect of the piston within the bore wall 20 for hopefully controlling friction. A small but uniform annular gap 24 is maintained between the skirt and bore wall. The area 23 can be sizable as evidenced by the illustration of FIG. 2 which shows the skirt of the piston unwrapped onto a flat plane. The area 23 faces and confronts the cylinder bore wall; such area extends from the oil ring groove 19 to the bottom of the skirt wall and around each of the pin opening support areas 26.

In contradistinction, FIG. 3 illustrates the piston of this invention having a shorter and surface relieved skirt wall 40. Piston 29 has a crown 28 and support structure 41 for transferring loads to or from a connecting rod assembly (the structure 41 has walls depending from the crown to define a pin opening 14 aligned along the diametrical axis 15). The shorter axial length 42 of the skirt wall 40, made possible by this invention, extends from the oil ring groove 43 to slightly below the opening 14.

This invention coats the piston skirt with a novel solid film lubricant 44 (see FIG. 8) that attracts oil and uses such attracted oil to maintain low-frictional characteristics contributed by the solid ingredients. The solid film lubricant is locked in place on such surface, polished, and dimpled to create pockets for oil film replenishment. In addition, the piston skirt is modified to provide relief areas around lands supporting the solid film lubricant to reduce the interfacing area of the piston with the bore wall.

FIG. 4 illustrates how the skirt wall is relieved at areas 30, 31, 32, 33 on one side of the piston. The relief may be carried out by mechanical machining to a depth 34 (see FIG. 9) of about 20-30 microns or by electrical discharge machining. The unrelieved portion of the skirt wall becomes a land or lands 35 for sliding engagement along the cylinder bore wall. It is desirable if the lands 35 are comprised of margins or strips 35a, 35b, 35c, and 35d extending along the periphery of the skirt wall 23, and margins 35e and 35f extend above and below the pin opening areas 30 and 33. A margin or rib 36 is defined to extend across the central region of the skirt wall, preferably as an axially extending bisector. The width of such margins 35a, 35b, 35c, and 35d can be in the range of 3-10 mm (or ⅛-⅜ of an inch) with margin 36 having a width in the range of approximately 5-8 mm. These margins provide a total land area of at least one square inch for a four-inch diameter piston and up to a land area of 2-3 in$^2$ for a larger diameter piston.

The solid film lubricant (as shown in FIG. 8) is deposited only onto such lands as the coating 44 in a thickness 47 of 10-35 microns. The coating may be applied by a conventional roller/silk screen or ink pad type application process. The coating consists of solid lubricants 45 (graphite, $MoS_2$, BN) and a support resin 46. The solid lubricant ingredients are operably present as a percentage of the total lubricant in the amount of about 25-58% for each of graphite and molybdenum disulfide, and about 7-16% for boron nitride. The solid film lubricant provides a composite coefficient of friction of 0.03-0.06, with graphite inherently having a coefficient of friction of 0.02-0.06, molybdenum disulfide of 0.04-0.06, and boron nitride of 0.02-0.10. The presence of both molybdenum disulfide and boron nitride in roughly equal proportions within the lubricant provides high-temperature enhancement of the lubricant to temperatures as high as 700° F. (molybdenum disulfide alone breaks down to a powder at about 580° F., but in the presence of BN does not break down to 700° F. and oxidation of the lubricant is inhibited) as well as increased load bearing capacity.

Graphite increases its frictional characteristic upon evaporation of water and hydrocarbons residing between the macrostructure of graphite. The resin herein is inventively selected to (i) provide a functional base operative with water while being effective to replenish the hydrocarbon or water in graphite up to a temperature of at least 700° F., and (ii) attract oil to carry an oil film on the coating of about ½-5 microns. The resin is present in the coating 44 in an amount of 20-60% by volume and acts as a bond between the solid lubricant particles.

Examples of resins useful for this invention are as follows: (a) thermoplastics such as polyaryl sulphone, polyphynelene sulphide (RYTON of Phillips Petroleum Co.); (b) thermosets such as conventional high-temperature epoxy, for example, bisphenol A with a curing agent of dicyandiamide and a dispersing agent of 2, 4, 6 tri(dimethylaminomethyl)phenol; (c) heat curing polyimides or polyamide emides such as commercial Torlon.

When using the above-identified solid film lubricant and resin, the total coefficient of friction in an oil-fed system has been measured to be 0.03-0.06 in the boundary/dry lubrication region. The amount of oil attraction by such resin has been measured to be at least ¼ micron thick in the oil film in cured state, and the water replenishment in the graphite has been measured to be at least 10% of its weight in the powder form.

Figure 5:
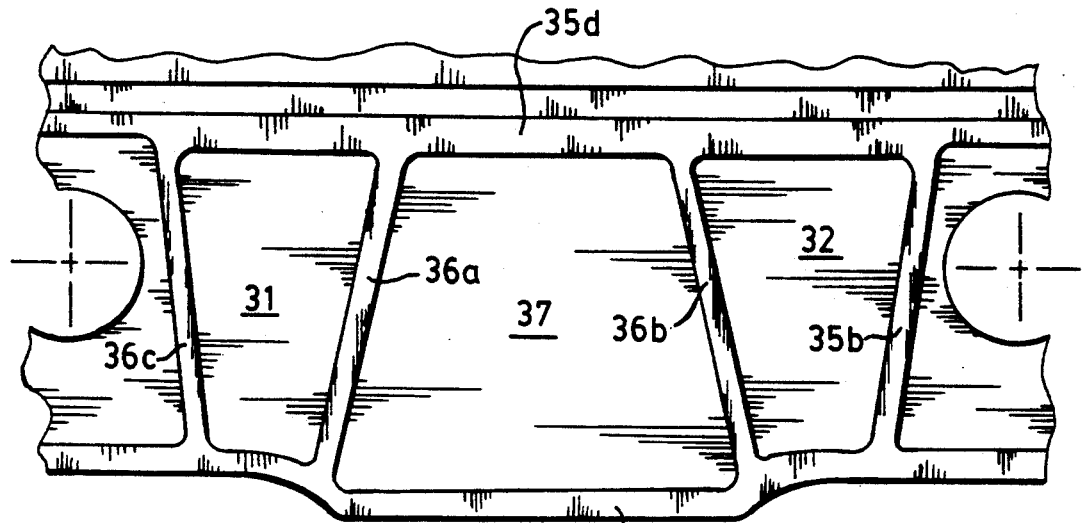
FIGS. 5-6 are unwrapped skirt wall illustrations for alternative designs of skirt wall relief to define the lands.
Figure 6:
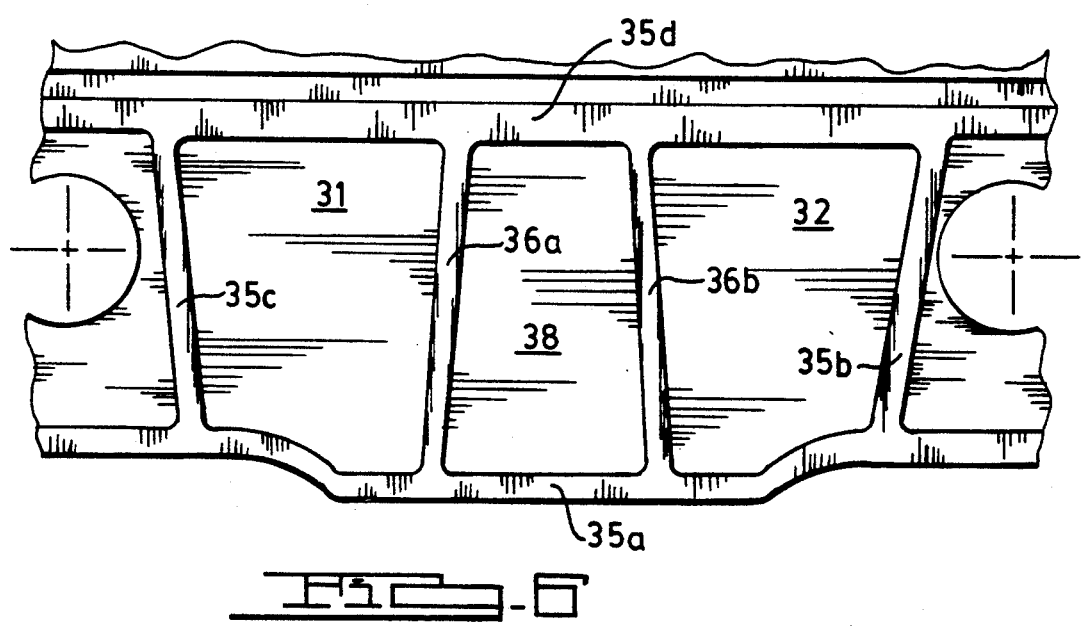

Alternative arrangements of the lands can be as shown in FIGS. 5 and 6. The benefit of these alternative embodiments is to enhance the size and location of oil reservoirs during transient mode operation of the engine, such reservoirs being critical to the retention of the oil film to promote mixed and hydrodynamic lubrication.

Method of Making

Figure 10:
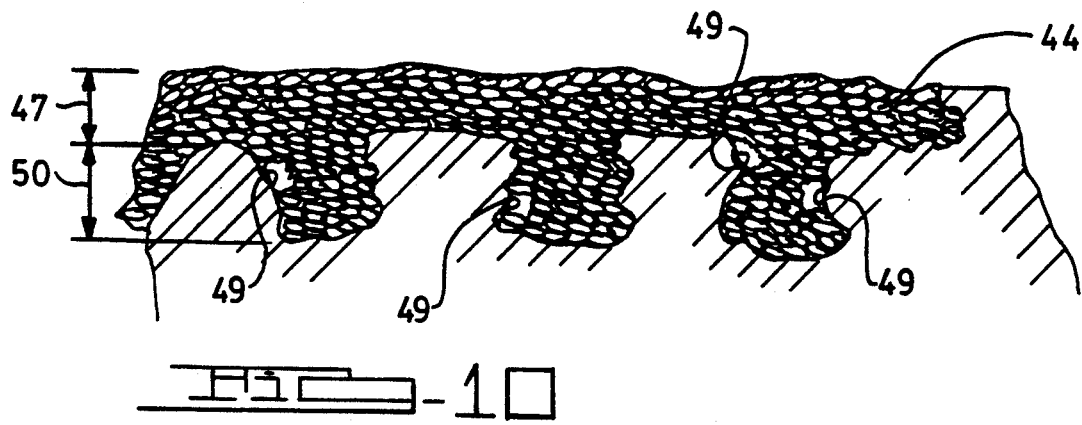
FIGS. 10-12 are high enlarged microsectional views of the piston land surface and coating including asperities thereof, such views showing, in sequence, the change in the coating as a result of deposition, polishing, and pocket formation.
Figure 11:
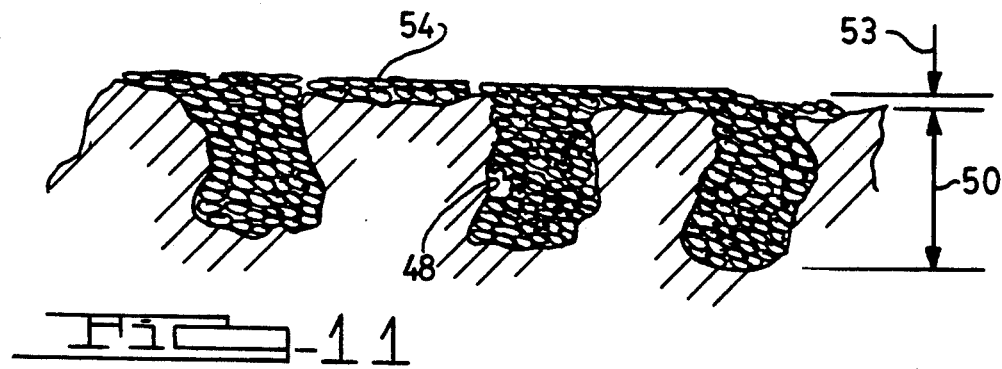
Figure 12:
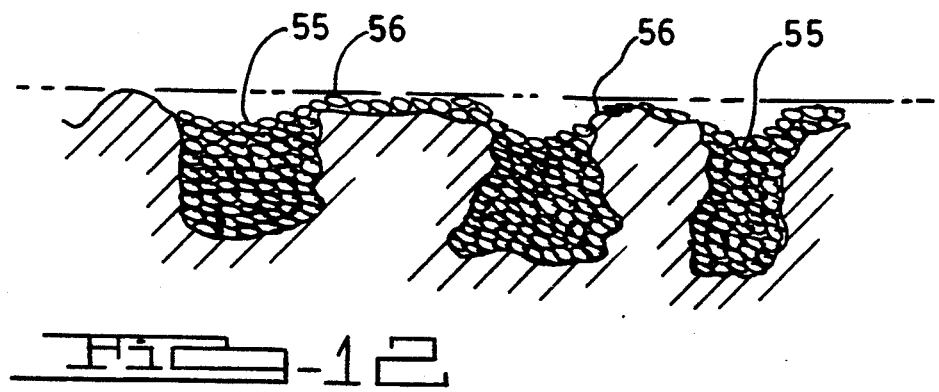

The method of making of a low-friction piston for use in an oil-fed cylinder bore 20 comprehends, first, providing a cylindrical piston body 29 with a crown 28, skirt walls 40 depending from the crown 28, and structure 41 for supporting at least the crown about a diametrically extending pin axis 15. As shown in FIG. 7, the side walls 40 have portions on opposite sides of the pin axis 15 conforming to the shape of the bore wall 20 but define a radial gap 48 therebetween. Also, as shown in FIG. 9, the exterior of the skirt wall is undercut at 34 to define radially exposed lands 35, 36 for sliding along the bore wall 20. Next, a predetermined pattern of asperities 49 (having a depth 50) is introduced into said lands 35, 36, as shown in FIG. 10. Next, the solid film lubricant coating 44 (of the chemistry hereabove defined) is sprayed onto the lands and into the asperities, such as by a thermal gun 51 projecting a spray 52, to a thickness 47 for the coating 44 (see FIGS. 7 and 8). Next, the solid film lubricant coating is polished to a reduced thickness 53 (see FIG. 11), providing tenacious low-shear crystals 54 which enhance or reduce the coefficient of friction. Finally, shallow pockets 55 are formed at the asperity mouths 56 such as by brushing or other equivalent means (see FIG. 12).

The undercutting may be carried out by machining, preferably to a depth of about 20-30 microns to produce lands varying in total land area of about 0.5 in$^2$ to 1.5 in$^2$. The asperities 49 are preferably introduced by acid etching (i.e., a dilute hydrofluoric acid followed by a dilute nitric acid HNO$_3$) of the land substrate, which is preferably constituted of an aluminum alloy of grade 330; the asperities will be randomly located as a result of such acid etching. Alternatively, the asperities may be incorporated by mechanical means such as by low-pressure grit blasting (15 psi maximum pressure with grit size of about −250 mesh or finer) or use of a hard stainless steel wire (0.004" diameter wire bristles) wheel, each followed by etching as before. Following such wire brushing and etching with 10% Nital (nitric acid in ethanol is adequate). An alternate surface treatment process is use of commercial zinc phosphate coating such as one used for ferrous parts, adapted to be appropriate for aluminum alloy.

Adhesion of the solid film lubricant coating 44 is ensured by the kinetic energy of the thermal spraying technique which entraps the solid film lubricant in the asperities. Curing at a temperature of 250°–400° F. achieves near complete crosslinking. A preferred procedure is to apply the coating on the part at 200°–250° in 2–5 micron layers to build up to the specified thickness followed by holding at 250° F. for 15–45 minutes and then at 400°–450° F. for 15–30 minutes. Alternately, the coating can be applied onto the part at room temperature, then slowly heated to 250° F. (room temperature to 250° F. in 15 minutes), and then held at 250° F. for 15–45 minutes followed by heating to 400°–450° F. and held for 15–30 minutes.

Polishing of the solid film lubricant coating can occur as a result of the use of a burnishing tool or as a result of actual in-service use of the piston against the bore wall causing transfer of the solid film lubricant to the cylinder bore wall itself. Once the transfer layer 57 is formed on the cylinder bore wall to a thickness 58 (See FIG. 9) of about 0.1–5 microns (requiring approximately a few minutes to a few hours depending upon the design), the interaction with the piston against the cylinder bore wall will create a tenacious low-shear film 57 having lower friction.

Because of the selection of the particular solid film lubricant resin, the coating promotes rapid oil film formation thereon. The coating may also have incorporated thereacross grooves 66 (to a depth 59 of about 30–120 microns) effective to capture oil film during the reciprocal movement of the piston (see FIG. 8). However, because of the increased affinity for oil of this new coating, the need for grooves (straight or spiral) may not be necessary. Thus, the polished solid film lubricant will have a very smooth finish (approximately 10 microinches finish).

The pockets 55 are formed in the mouth areas 56 of the coating asperities by steel wire brushing or equivalent to achieve the dimpling effect and thus create oil pockets, comparable to having separate grooving. The wire brushing is effective because it removes the softer coating at the polished surface.

Method of Using

Figure 14:
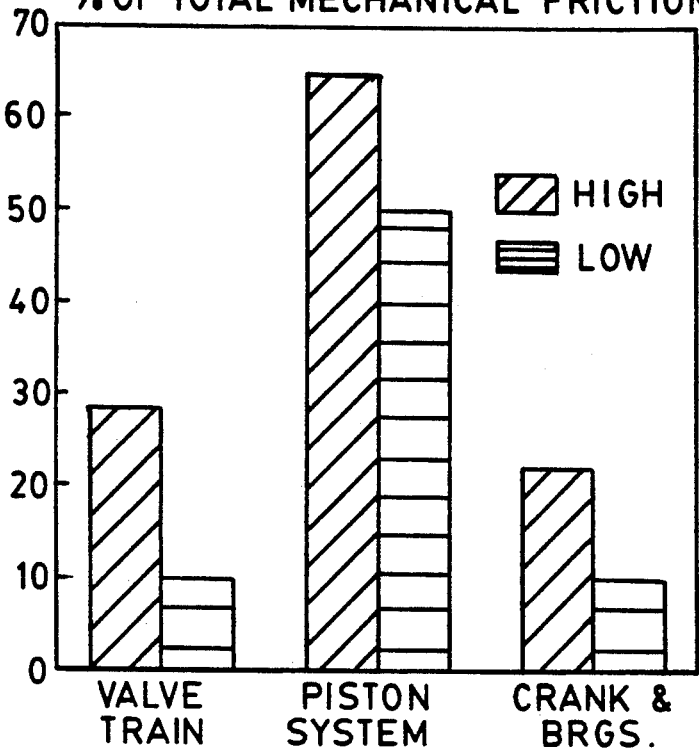
FIGS. 14, 16-19 are bar graphs illustrating friction related performance data for engines.

The piston system, as a component of total engine friction, is high, as illustrated in the data in FIG. 14. The friction portion contributed by the valvetrain or crank and bearings is significantly smaller. Engine friction can be substantially reduced by a method of using a low-friction piston 10 in a oil-fed (means 65) cylinder bore 20 of a reciprocating assembly 60, comprising: (a) providing a low-friction piston resulting from the method of making described above; (b) mounting such piston on a connecting rod means 61 having a pin 62 connecting one end of said rod to the piston for articulate reciprocating movement within the bore, such rod means 61 exerting a force on the skirt not aligned with the axis 16 of reciprocation; and (c) operating the reciprocating assembly to transfer a portion 57 of the solid film lubricant coating to the cylinder bore wall at least at regions of piston slap. The coating being present on said piston skirt walls in a thickness 47 of lambda ($\lambda$) greater than 6 (lambda being the ratio of the height of the oil film thickness 34 to the depth 50 of the asperities 49).

Figure 15:
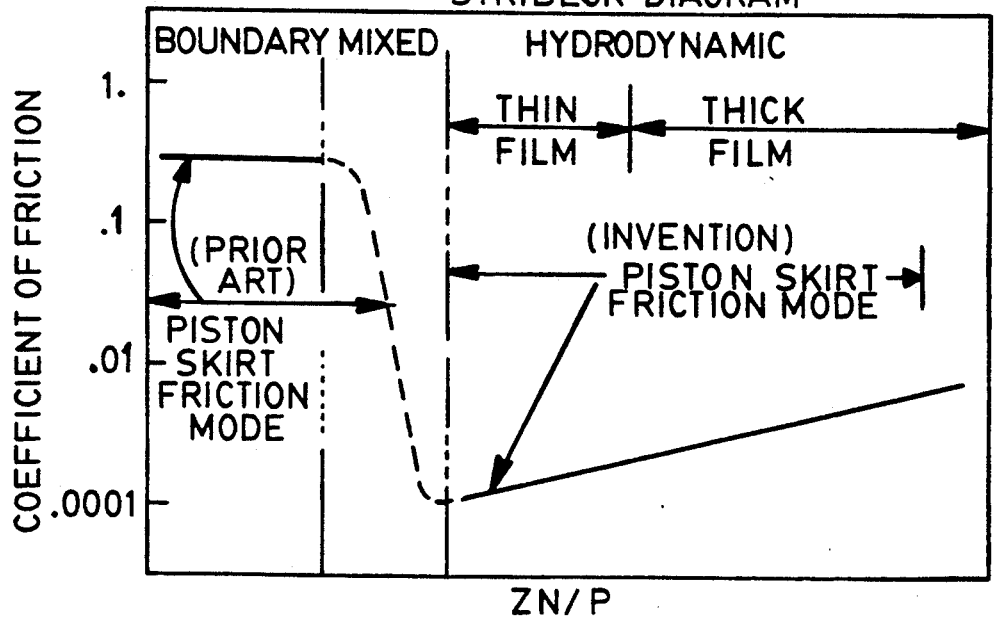
FIG. 15 is a Stribeck diagram illustrating friction in a lubrication system.

Recent research shows that piston slap (an angled thrust of the piston skirt against the cylinder bore as a result of the articulated movement of the connecting rod) generates boundary-to-mixed lubrication mode during such movement of the piston (see FIG. 15). This is undesirable because the coefficient of friction is at its highest level (above 0.14) in the boundary lubrication regime and above 0.05 in the mixed lubrication regime, characteristic of prior art piston skirt assemblies. Even with a single solid film lubricant coating on such prior art piston skirts, the lubrication regime is not shifted substantially to hydrodynamic. This invention achieves a coefficient of friction between the piston and cylinder bore wall) that is at or below 0.04; this means the piston skirt, operating with an oil-fed system, is operative in substantially the hydrodynamic lubrication regime with possibly a minor amount in the mixed lubrication regime (see Stribech diagram of FIG. 15 plotting ZN/P as a function of friction). This reduction in coefficient of friction is significant since the amount of friction the piston skirt contributes to the total engine friction losses is sizable, as shown in FIG. 14; the piston system friction contribution to the entire system may be as much as 50% or more.

In this invention, novel friction reduction is achieved substantially as a result of oil film attraction and by definition of oil replenishing reservoirs in the piston skirt wall, both features leading to replacement of boundary or mixed lubrication with hydrodynamic lubrication. Piston making herein is enhanced in novelty by asperity definition containing SFL, which SFL is dimpled, such as by brushing, to provide oil pockets to replenish the attracted oil film. A fuller potential of friction reduction can be realized in a method of using such piston product, made with such fabricating technique, in a reciprocating assembly where there is further reduction in any mixed lubrication regime as a result of the transfer of the SFL to the cylinder bore wall, ensuring more complete hydrodynamic lubrication regime as a result of a designed increased gap and oil squeeze film accompanied by dynamic feeding of the oil film to both the piston and bore wall by a variety of oil reservoirs.

This method of use (i) reduces the minor mixed lubrication regime activity by reducing the intercontact area (lands) between the piston and cylinder bore wall thereby promoting a polished (microsmooth) transferred SFL coating to the cylinder bore wall as a result of the higher surface loading at the lands, (ii) ensures that most of the lubrication regime will be hydrodynamic by introducing an artificially larger, oil-filled gap 48 between the piston and cylinder bore wall (such gap 48 being in the range of 0.0008–0.0012 inch (20–30 microns) and ensuring that the oil film is replenished.

This invention adopts the principle that when λ (ratio of the attacted oil film thickness h to the height of the asperities or λ=h/a) is equal to or less than 1.0, the lubrication regime will be boundary (attaining a coefficient of friction greater than 0.15). When λ is equal to or greater than 6, the lubrication regime will be hydrodynamic and the coefficient of friction will be less than 0.05.

The gap 48 between the piston skirt and the cylinder bore wall to achieve piston support during reciprocation, and yet achieve a λ of 6 or greater, should be in the range of 5–25 microns. Oil film replenishment is effected by having the coating with asperity mouth pockets having a depth in the range of 5–30 microns, by spiral or biased grooves having a depth of 30–60 microns, and by having the lands supporting the SFL raised above the skirt wall a height of 15–45 microns.

The area of thrust surfaces is reduced to a minimum so that the SFL impregnated surface is subjected to significantly higher thrust loads. For any speed/load condition, the piston side load and the maximum contact force dictate the minimum area. Since this SFL has high load bearing capabilities and extremely low wear rates at loads up to 10,000 psi and the maximum piston side load is around 200 pounds, a thrust surface area can be as low as one square inch. In keeping with this dictate for thrust surface area, the three versions shown in FIGS. 4, 5, and 6 are designed with this in mind.

The object of the undercut portion is to retain oil, particularly during the downstroke of the piston, and to generate a pseudo hydrodynamic squeeze film of at least 20–30 microns thickness. The oil volumetric thermal expansion due to the oil heating will wash and lubricate the thrust surfaces and thereby reduce wear. Thin grooves are cut on the upper and side arms of the land pattern to relieve oil pressure as well as to fill the undercut portion with oil.

Figure 16:
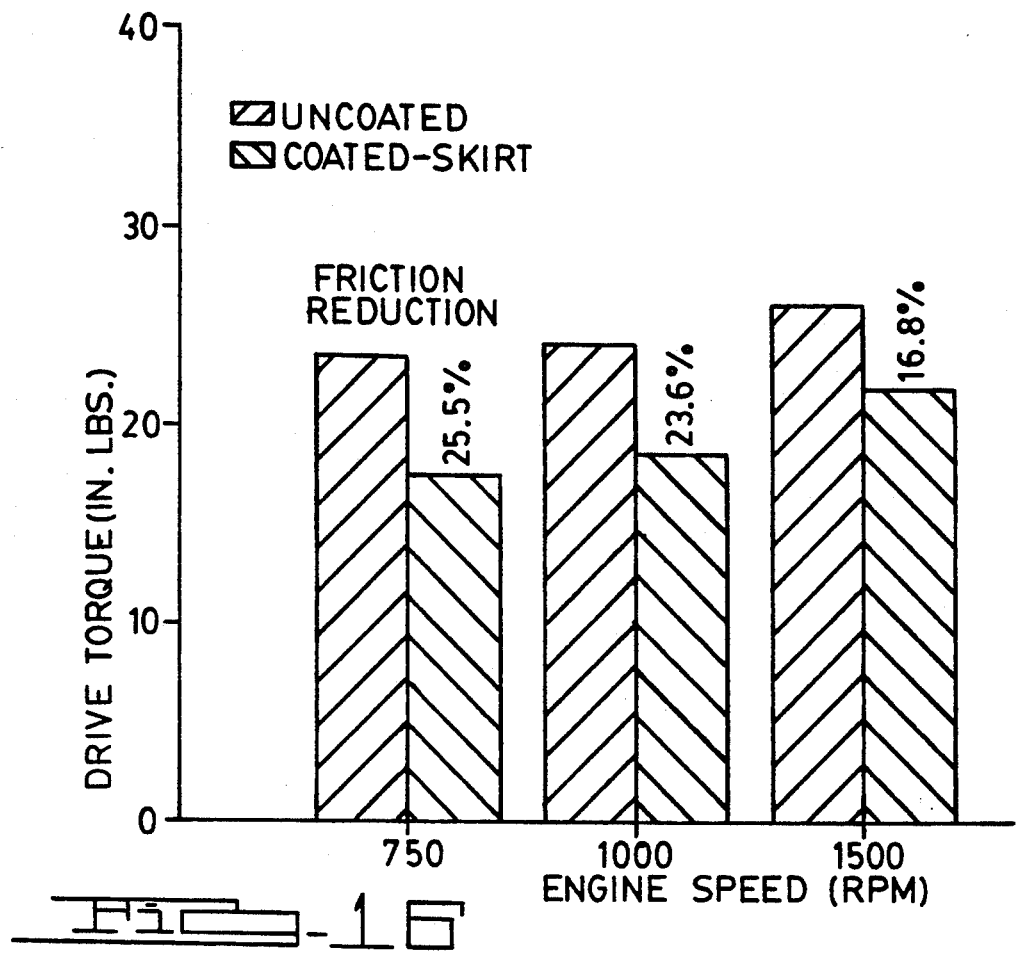
Figure 17:
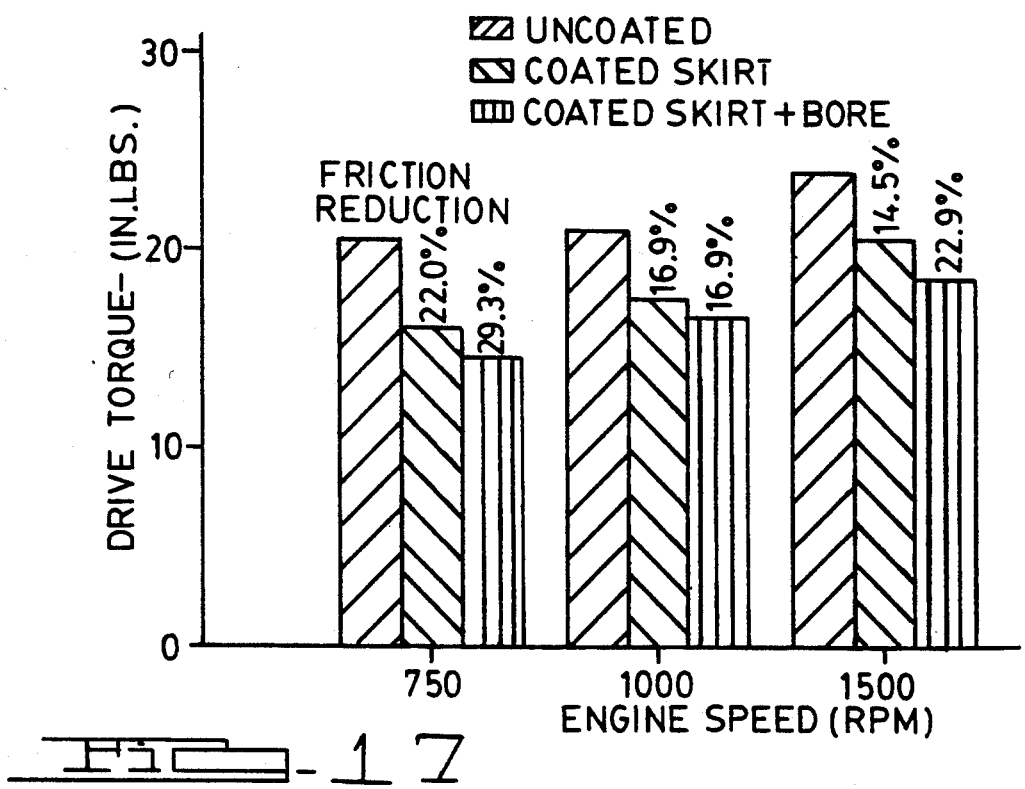
Figure 18:
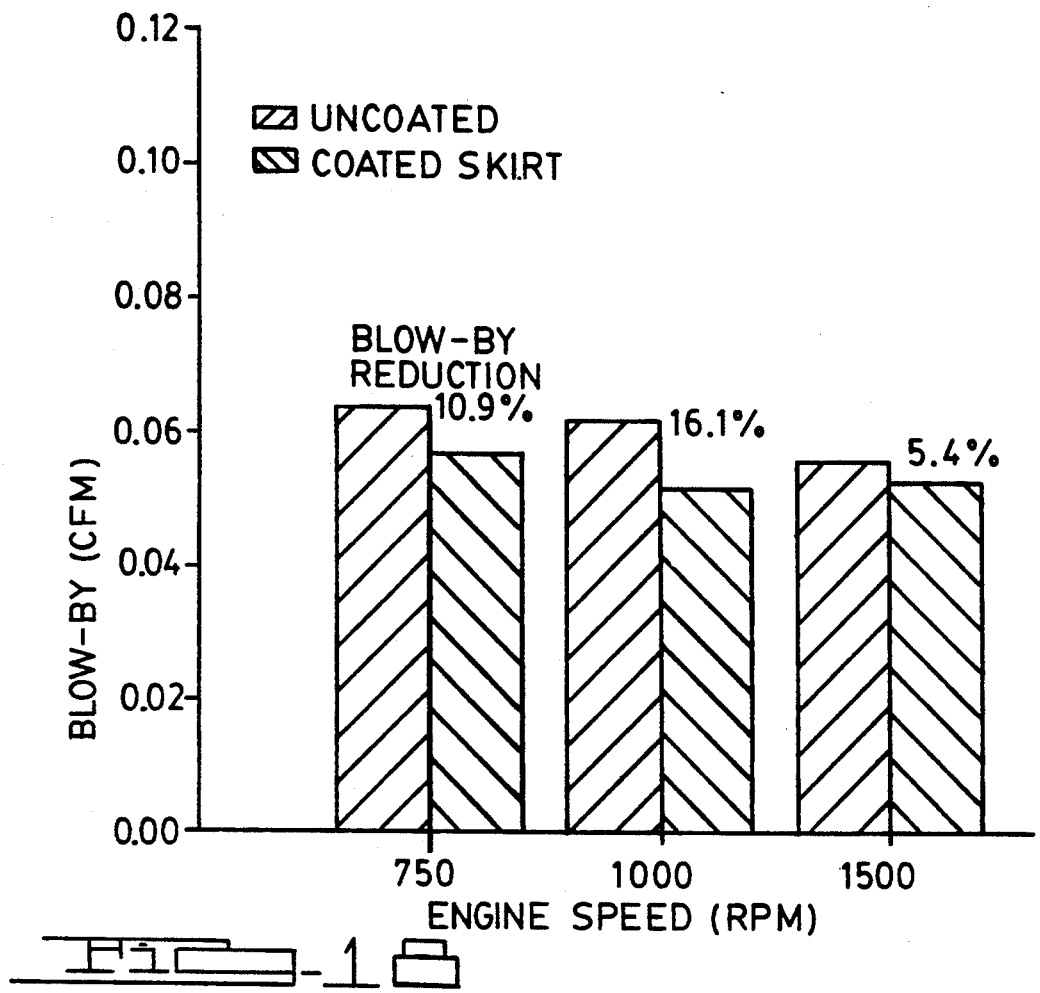
Figure 19:
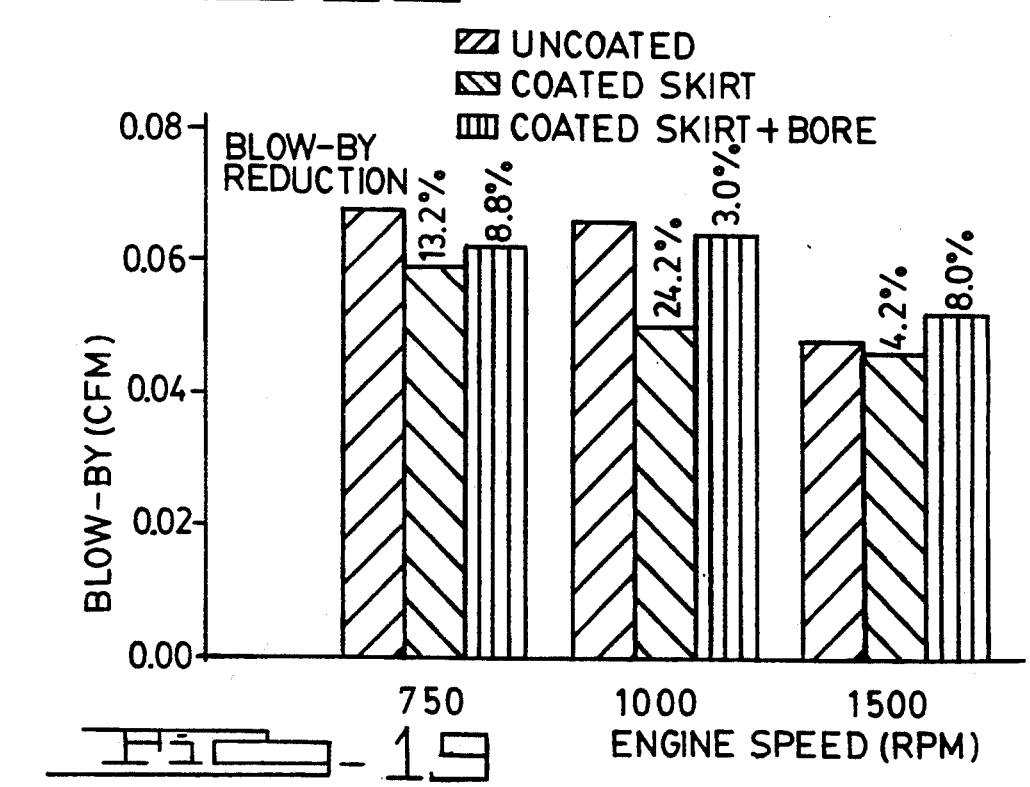

FIG. 16 illustrates data collected for drive torque of an engine (in-line 4 cylinder, 1.9 liters) using pistons uncoated and coated in accordance with this invention at various engine speeds under partial oiling (defined to mean near dry operation of a conventional engine such as that experienced in case of low oil pump pressure or failure). FIG. 16 shows the coated piston to be superior by double-digit decreases in drive torque. FIG. 17 further demonstrates the reduction in torque when the cylinder bore is additionally coated. FIGS. 18 and 19 show comparable bar graph data for engine blow-by (defined to mean leakage from combustion chamber into crankcase) as function of speed for engines having coated and uncoated pistons under full oiling (meaning fully lubricated condition in the engine). Note that blow-up increases when the cylinder bore is also coated due to reduced wear; however, when the bore and piston are designed for minimum distortion, both friction and wear as well as blow-by will decrease due to more uniform contact and improved sealing. With a coating thickness in the 5–35 micron range on the piston and piston-to-cylinder bore clearance in the 5–20 micron range, conventional piston slap noise will be virtually eliminated.

We claim:

1. A low-friction piston construction for use in an oil-fed cylinder bore wall, comprising:
   (a) means providing a piston crown extending substantially across the entire cross-section of said cylinder bore wall and for sliding movement therein;
   (b) a circumferentially extending skirt wall depending from said piston crown; and
   (c) reciprocating force transmitting means connected to an interior of at least one of said skirt wall and crown, said skirt wall having portions thereof relieved in a radially inward direction, at least the unrelieved portions of said skirt wall having a solid film lubricant coating on its exterior thereof consisting of graphite, molybdenum disulfide, boron nitride, and epoxy resin, said resin comprising a polymer base that provides a supply of at least one of water vapor and hydrocarbon to the graphite component and is effective to attract an oil film thereonto.

2. A method of making a low-friction piston for use in an oil-fed cylinder bore wall, comprising:
   (a) providing a cylindrical piston body with a crown, side walls depending from said crown, and structure for supporting at least said crown, about a diametrically extending pin axis, said side walls having portions on opposite sides of said pin axis, conforming to the shape of said bore wall but defining a radial gap therebetween;
(b) undercutting the exterior of said side walls to define radially exposed lands for sliding along said bore wall;
(c) introducing a predetermined pattern of asperities into said lands;
(d) uniformly spraying a solid film lubricant coating onto said lands, said coating consisting of solid film lubricant crystals and a supporting resin, said resin comprising a polymer base that provides a ready supply of at least one of water vapor and hydrocarbon to the solid lubricants and is effective to attract an oil film thereto;
(e) forming shallow pockets at the mouth of said asperities; and
(f) polishing the exposed solid film lubricant crystals to further reduce the height of said asperities.

3. A low-friction piston construction for use in an oil-fed cylinder bore wall, comprising:
(a) means providing a piston crown extending substantially across the entire cross-section of said cylinder bore wall and for sliding movement therein;
(b) a circumferentially extending skirt wall depending from said piston crown; and
(c) reciprocating force transmitting means connected to an interior of at least one of said skirt wall and crown, at least portions of said skirt wall having a solid film lubricant coating on its exterior thereof consisting of graphite, molybdenum disulfide, boron nitride, and epoxy resin, said resin comprising a polymer base that provides a supply of at least one of water vapor and hydrocarbon to the graphite component and is effective to attract an oil film thereonto.

4. The piston construction as in claim 3, in which the solid lubricants of said coatings are present in an amount, by percentage weight of the total solid lubricants, as follows: 29–58% for each of graphite and molybdenum disulfide, and 7–16% for boron nitride.

5. The piston construction as in claim 3, in which said coated piston has a coefficient of friction, in an oil-fed cylinder bore, in the range of 0.02–0.06 at temperatures up to 750° F.

6. The piston construction as in claim 3, in which said lands surround at least the periphery of said skirt.

7. The piston construction as in claim 3, in which said solid film lubricant coating has a resin comprised of one of thermoplastic and heat curing polyimide.

8. The piston construction as in claim 3, in which said solid film lubricant coating has a resin comprised of a thermoset plastic that crosslinks at least (25–40%) to a high molecular weight, a curing agent of dicyanidimide present in an amount of 2–5%, and a dispersing agent of 2, 4, 6 tri(dimethylaminomethyl)phenol present in an amount of 0.3–1.5%.

9. A method of making a low-friction piston for use in an oil-fed cylinder bore wall, comprising:
(a) providing a cylindrical piston body with a crown, side walls depending from said crown, and structure for supporting at least said crown about a diametrically extending pin axis, said side walls having portions on opposite sides of said pin axis to define lands, conforming to the shape of said bore wall but defining a radial gap therebetween;
(b) introducing a predetermined pattern of asperities into said lands;
(c) uniformly spraying a solid film lubricant coating onto said lands, said coating consisting of solid film lubricant crystals and a supporting resin, said resin comprising a polymer base that provides a ready supply of at least one of water vapor and hydrocarbon to the solid lubricants and is effective to attract an oil film thereto;
(d) forming shallow pockets at the mouth of said asperities; and
(e) polishing the exposed solid film lubricant crystals to further reduce the height of said asperities.

10. The method as in claim 9, in which said asperities are produced by use of acid etching to produce a random pattern of asperities.

11. The method as in claim 9, in which said solid film lubricant coating is provided with a pattern of microgrooving.

12. The method as in claim 9, in which said pockets in said solid film lubricant at the mouth of said asperities are created by brushing to remove and dimple the solid film lubricant at such mouths.

13. The method as in claim 9, in which said solid film lubricant is comprised of organic base and is deposited by air atomization spraying using a solvent base or waterbase emulsion followed by stage curing.

* * * * *